May 25, 1937.  W. MELAS  2,081,364
MEASURING SYSTEM
Filed April 2, 1934  3 Sheets-Sheet 2

INVENTOR.
William Melas
BY
Cornelius D. Ehret
his ATTORNEY.

May 25, 1937.  W. MELAS  2,081,364
MEASURING SYSTEM
Filed April 2, 1934   3 Sheets-Sheet 3

Patented May 25, 1937

2,081,364

UNITED STATES PATENT OFFICE 2,081,364

MEASURING SYSTEM

William Melas, Bala-Cynwyd, Pa., assignor to Cochrane Corporation, Philadelphia, Pa., a corporation of Pennsylvania Application April 2, 1934, Serial No. 718,641

32 Claims. (Cl. 177—351)

My invention relates to systems for measuring, recording, or control of the magnitude or changes in magnitude of a condition, as rate of flow of a fluid.

In accordance with one aspect of my invention, a change in magnitude of the condition under measurement effects movement of a magnetic core relative to inductance coils of a network to unbalance it and the resulting unbalance current effects deflection of a galvanometer controlling a mechanical relay which varies the position of another magnetic core relative to other inductance coils of the network to restore it to balance.

Further in accordance with my invention, the aforesaid first core is movable, as by the float of a manometer or other responsive device, within a tube of metal or alloy, about which said first coils are disposed, whose specific resistance is not high, but on the contrary low or of ordinary magnitude.

My invention also resides in the methods, systems and apparatus having the features of novelty hereinafter described and claimed.

This application is a continuation in part of my application Serial No. 579,944, filed December 9, 1931, now U. S. Letters Patent No. 2,010,554.

For an understanding of my invention and for illustration of apparatus and systems embodying it, reference is to be had to the accompanying drawings, in which:

Figs. 3 and 4 are views, partly in section, of a flow-meter and thermometer, respectively, adapted for use in the systems of Figs. 2 and 2a;

Figure 1:
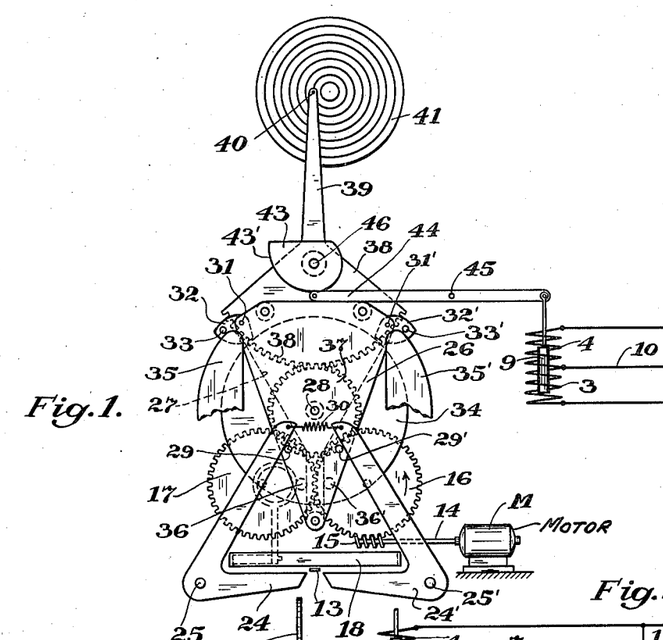
Fig. 1 is a schematic front elevational view of a mechanical relay and recorder.
Figures 2, 2A:
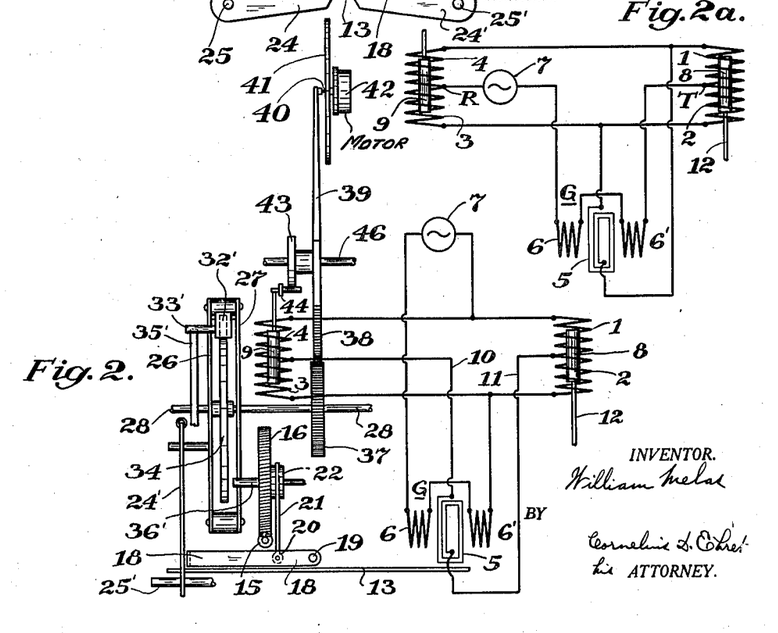
Fig. 2 is a side elevational view of the relay of Fig. 1 and a circuit diagram of a network employed therewith.
Fig. 2a is the circuit diagram of another network suited for use with the mechanical relay of Figs. 1 and 2.

Referring particularly to Figs. 1 and 2, a measuring bridge of the inductance type comprises inductance coils 1, 2, 3 and 4, preferably wound on non-magnetic spools (not shown). One end of each coil is connected, as shown, to the movable coil 5 of an alternating current galvanometer G or other sensitive current detecting instrument. Coils 6 and 6' comprise the field of the galvanometer, and are connected in circuit with inductance coils 1, 2 and 3, 4 and a source 7 of alternating current. Coils 1 and 2 have a movable core or plunger 8 of magnetizable material, the position of the core within the coils determining their relative inductance, and therefore their relative impedance. The coils 3, 4 have a similar core or plunger 9 of magnetizable material, the position of which determines the relative impedance of the coils. The position of plunger 8, relative to the coils 1 and 2 is caused to vary in accordance with the magnitude, or variation in magnitude, from a predetermined value, of the quantity or condition to be measured, by a rod 12, preferably of non-magnetizable material, secured to a member movable from its normal position in response to said quantity or magnitude, in the manner illustrated in Figs. 3, 4 and 5.

The inductance coils 1, 2, 3, 4 and the galvanometer G comprise a Wheatstone bridge circuit, supplied with alternating current from the source 7, the relative positions of the cores 8 and 9 determining a balanced or unbalanced condition of the bridge, as the case may be. The relative impedances of the coils 1 and 2 are dependent upon the position of core 8, and if the core 9 is in the same relative position in coils 3 and 4, the bridge is balanced and no current will flow through the galvanometer coil 5, and therefore its pointer or needle 13, attached to and carried by the movable coil 5, will remain in the mid-position, Fig. 1, to which it is normally biased by means of control springs or filaments (not shown) attached to the galvanometer.

In the modified circuit arrangement of Fig. 2a, the source of current 7 and the galvanometer field coils 6, 6' are in series between the common terminal R of coils 3 and 4 and the common terminal T of coils 1 and 2. In this network, also, the ratio of the impedances of coils 1 and 2 is dependent upon the position of the core, and if core 9 is in a position affording the same ratio of the impedances of coils 3 and 4, the network is balanced and no current flows through galvanometer coil 5.

When core 8 is moved within coils 1 and 2, their relative inductance is changed and the bridge is electrically unbalanced, so that current will flow through the galvanometer coil 5 and cause it and pointer 13 to deflect to one side or the other of its mid-position, dependent upon the direction of movement or displacement of the core 8, and by an amount proportional to the amount of displacement of the core. The pointer 13 controls mechanical relay mechanism to move the core 9 in a direction and by an amount which will restore the balance of the bridge in the following manner:

Assume, for example, that core 8 has been displaced upwardly, and has thereby caused the pointer 13 to deflect to the left, as viewed in Fig. 1. A source of power comprising a motor M, which is continuously driven at constant speed, either by direct or alternating current, as source 7, rotates the shaft 14 carrying worm gear 15. The worm gear rotates gear 16 which meshes with a similar gear 17, the gear 16 rotating in a counter-clockwise direction, and gear 17 rotating in a clockwise direction, as viewed in Fig. 1. A U-shaped depressor bar 18 is pivoted on either side at 19, Fig. 2, and is alternately raised and depressed, at intervals of a second or two, by means of pivot pin 20, eccentric lever 21, and eccentric 22 attached to the gear 17. In the position shown in Fig. 1, the bar 18 is at that portion of its stroke which permits free swing or lateral movement of the galvanometer pointer 13, and the pointer is therefore free to deflect, as to the left, between the lower surface of bar 18 and the upper surface of left-hand bell crank lever 24. Immediately following the interval in which the galvanometer is allowed to deflect, the bar 18 is depressed, and the pointer 13 is clamped between the bar and the lever 24 at a point which represents the extent of its deflection. The bell crank lever 24 is pivoted at 25, and is adapted to rotate in a clockwise direction about its pivotal point until the bar 18 reaches the bottom of its stroke. In so doing, it will rotate the yoke assembly comprising plates 26 and 27 in a counter-clockwise direction about a shaft 28 by reason of the contact of the bell crank lever with pin 29 secured to and extending from plate 26. It will be seen that, for small deflections, the pointer will engage the bell crank lever at a point far from the pivotal point 25, and for large deflections the lever is engaged at a point near the pivotal point. Therefore, the greater the galvanometer deflection, the greater the deflection of the bell crank lever and yoke assembly. A second bell crank lever 24' is adapted to be actuated in a counter-clockwise direction, when the pointer 13 is deflected to the right, for actuating the relay structure in a corresponding direction. A tension spring 30 serves to keep the bell crank levers in contact with pins 29 and 29', respectively.

The yoke assembly carries at its upper end, by means of pivots 31 and 31', the pawls 32 and 32', respectively, each pawl being eccentrically mounted with respect to a clutch wheel 34 for the purpose hereinafter disclosed. Pins 33 and 33' secured to and extending from the pawls serve to keep one or the other of the pawls out of engagement with the clutch wheel 34, to prevent rotation of the wheel in the wrong direction, by engagement of the pins with the outer edges of fixed members or cams 35 and 35' (shown broken away), the edges comprising arcs having their centers coincident with the axis of rotation 28 of the yoke assembly. Since the yoke assembly has now been moved in a counter-clockwise direction, the pawl 32 is out of engagement with the clutch wheel 34 because its pin 33 rides on the surface of cam member 35 for the duration of this movement, but pawl 32" has been brought into engagement with the clutch wheel 34, although it does not rotate the wheel during counter-clockwise movement because the shape of the pawl and its position with respect to the clutch wheel cause the pawl to rotate counter-clockwise to an extent sufficient to permit its travel over the surface of the wheel.

After rotation to an extent dependent upon the amount of deflection of the pointer 13, the yoke assembly is brought back to its normal or mid-position by a stud or pin 36' carried by and extending from the rotating gear 16, the pin engaging an edge of the plate 27, shown in dotted lines in Fig. 1, which forms the back plate of the yoke assembly. In thus returning to the mid-position, the pawl 32' is rotated in a clockwise direction by its contact with the clutch wheel 34, and due to the eccentric mounting of the pawl, its rounded surface will roll into wedging engagement with the clutch wheel, and therefore the pawl carries with it the clutch wheel which, through shaft 28, rotates gear 37 which engages a sector 38 pivotally mounted at 46. If desired, the clutch wheel may have serrations or teeth, and the pawl adapted to ratchet over the serrations when the pawl is carried in one direction by the yoke assembly, and to engage the serrations during return of the assembly to normal position.

The sector 38 carries an arm 39, and a marker or stylus pen 40 which bears upon a record sheet or chart 41 rotated by clockwork mechanism 42, a synchronous motor or equivalent, thus giving a graphic record of the variations in movement of the core member 8.

The sector 38 also carries cam member 43 copivotally mounted therewith, having a camming surface 43' which engages one end of lever 44 pivotally mounted at 45, the other end of the lever causing a displacement of core 9 in coils 3 and 4 in accordance with movement of the cam member. When the core 9 has been displaced, due to the rotation of the cam member 43, by an amount equal to the displacement of the core 8, the bridge will be rebalanced and galvanometer pointer 13 will return to its mid-position, at which time depression of the bar 18 will cause no movement of the bell crank members or clutch mechanism. When the unbalance is large the mechanical relay mechanism actuates by progressive incremental movement the element or member 9 to a network balancing position. The camming surface 43' may be shaped so that the relation of the recording pen 40 with respect to movement of the core 8 will follow any desired law.

The foregoing arrangement provides a recorder having high sensitivity and extreme accuracy, because the slightest condition of unbalance of the bridge circuit is detected by a sensitive instrument, as the galvanometer shown. Since no moving contacts are required in the measuring circuit, the recorder is free from error due to variable contact resistance. The position and movement of the recorder and the core 9 are obtained by relay mechanism powered independently of the measuring circuit, and the system is therefore free from errors caused by friction of parts in the recorder. In the systems illustrated in Figs. 1, 2 and 2a, each of the core members 8 and 9 is in a balanced magnetic field except when a condition of unbalance obtains in the bridge circuit, and this increases the sensitivity and accuracy of the system because no magnetic attraction on either core is required to be overcome before effecting movement of the core in response to a change in said quantity or condition.

Figure 3:
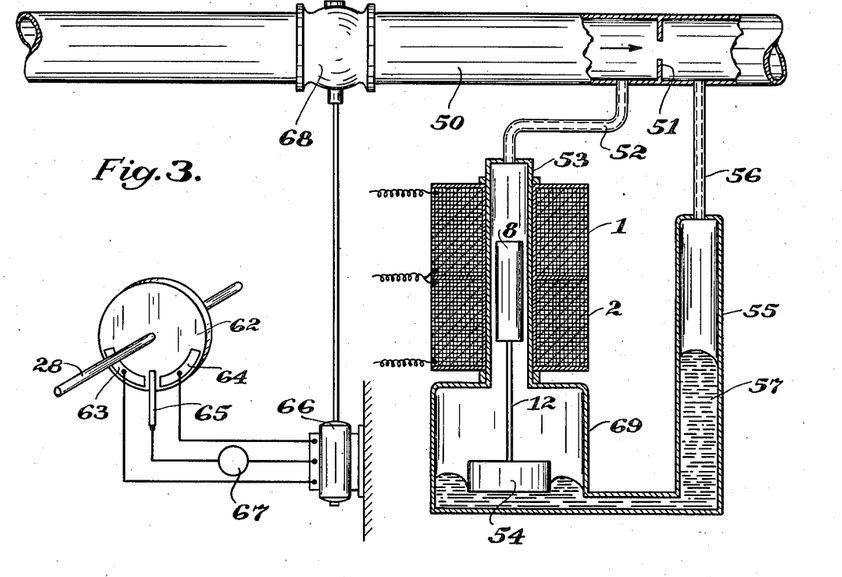

Fig. 3 illustrates the use of the invention to measure and record the flow of a fluid in a pipe 50. The pipe has a wall with an orifice 51 to provide a pressure differential which is a function of the rate of flow. The differential pressure may be produced by a Venturi or Pitot tube arrangement, etc. On one side of the orifice is a tube 52 in communication with a manometer chamber 69 comprising a pressure-tight tube 53 of non-magnetizable material. Surrounding the tube 53 are the inductance coils 1 and 2, and on the inside of the tube and adapted to reciprocate therewith is the core 8 attached by stem 12 of non-magnetizable material, as brass, to a float member 54, preferably of non-magnetic material. As the unbalance current, due to movement of core 8, is neither utilized to perform substantial work or effect movement of core 9 by magnetic attraction of coils 3, 4, nor to maintain the core 9 in any position, its magnitude, even for a large change in flow, or maximum change of position of core 8, need not and preferably should not be large. The tube 53, therefore, may have substantial conductance, the low value of current in the windings minimizing energy loss therein; it may be of copper, brass, bronze or other metal or alloy of comparatively low or ordinary specific resistance, for example not greater than 30 micro-ohms per centimeter cube, and it is not necessary that the walls of the tube be thin and/or that the clearance between the core 8 and the inside of tube 53 be small. Within reasonable limits, the thickness of the tube can be selected to afford the desired mechanical strength for the particular range of pressures the tube is expected to withstand in use; for high pressure work, for example, involving steam or working pressures of the order of 1,000 lbs. per square inch, the tube 53 will necessarily be of substantial thickness but without appreciable loss of sensitivity or accuracy in the electrical system inasmuch as the sensitive galvanometer and mechanical relay respond to minute unbalances of the network. In brief, because the electrical system is not called upon to do substantial work, such as moving and maintaining the position of the second core 9, the thickness of the tube 53 may be relatively large, its specific electrical resistance may be low, and the gap between core 8 and inner layer of the coil winding may be large, and large enough to accommodate a tube lining, when necessary, whose thickness is substantial and sufficient to withstand high pressure. The lack of need to have only slight clearance between the core and the inside of the tube simplifies the manufacture and reduces the cost of the instrument while retaining accuracy and sensitivity.

The manometer also comprises a second tube 55 in communication at its lower end with the chamber 69, and having its upper end in communication, by means of tube 56, with the low pressure side of the orifice 51 or equivalent. A sealing fluid 57 of mercury, or other liquid, causes the vertical position of float 54 to vary in accordance with the difference in pressure across the orifice, and as this difference in pressure is proportional to the square of the flow of the fluid in pipe 50, the position of float 54 and core 8 indicates the rate of flow through pipe 50. The inductance coils 1 and 2 may be connected in circuit in the manner shown in Fig. 2.

The shaft 28 of the relay mechanism may have a movable insulating drum 62 mounted thereon, and carrying arcuate contact strips 63, 64 adapted, upon rotation of the drum, to be engaged by a relatively fixed contact member 65, the contacts controlling a translating device, as the reversible motor 66, energized from a source of current supply 67. If the rate of flow in the pipe line 50 varies, the relay mechanism will rotate shaft 28 and drum 62 in one direction or the other dependent upon the direction of departure of the rate of flow from a predetermined value, and one of the contact strips will be engaged by contact member 65 to energize the motor 66 in a corresponding direction until the rate of flow returns to said predetermined value. The motor is mechanically connected to control the position of a valve 68 in the pipe line to regulate the flow of fluid therein, so that a given rate of flow may be automatically maintained by the measuring circuit and relay mechanism.

Figure 4:
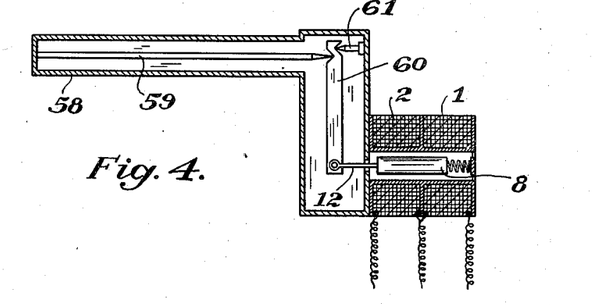

Fig. 4 illustrates the use of the invention to record temperature. In this arrangement a tube 58 of iron, or equivalent, encloses a rod or strip 59 of aluminum or equivalent material, having a temperature coefficient of expansion different from that of the tube 58, the rod abutting the tube at one end, and at its other end forming a knife blade for engagement with lever 60 having its one end supported by knife edge 61, with its free end carrying the core 8, the lever being biased, as by a small compression spring, to bear against the knife blade edge of the rod and knife edge 61. The tube and rod are placed in heat transfer relation to the structure or substance whose temperature is to be determined, and with temperature change the rod changes its length, with respect to the iron tube, the amount of change depending upon the change in temperature of the said structure or substance. This change in the length of the rod causes a corresponding variation in the position of the free end of lever 60, and varies the position of core 8 relative to the inductance coils 1 and 2, the inductance coils being connected to the measuring circuit in the manner of Fig. 2 or 2a.

In the foregoing, the cores 8 and 9 are referred to as the movable elements, but it will be understood that, in various arrangements, either of them may be stationary, and the inductance coils movable, since it is the relative movement between them that varies the inductance and, hence, the relative impedances of the arms of the bridge circuit.

Figures 5, 5A, 6:
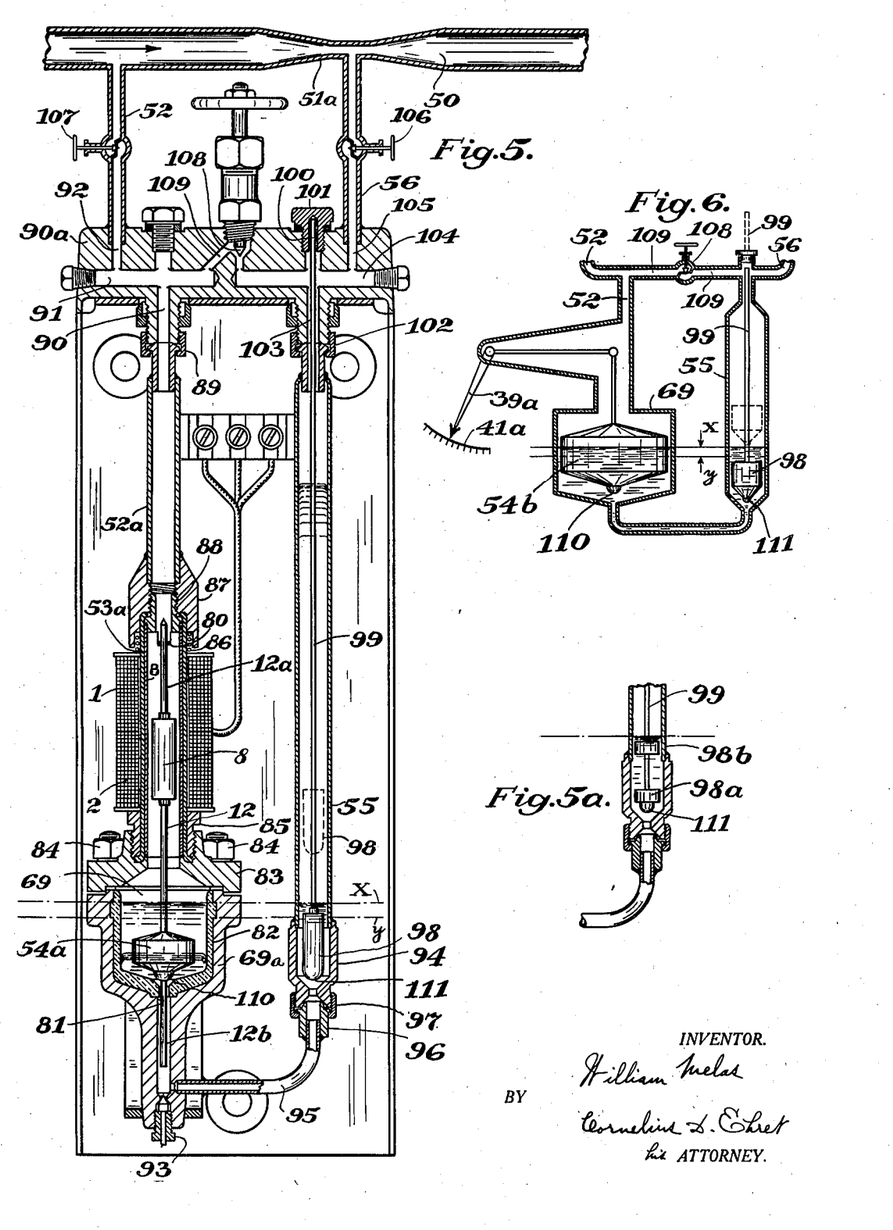
Fig. 5 is a front elevational view with parts in section of a flow-meter for use in the systems of Fig. 2 or 2a having a calibrating displacer element.
Fig. 5a is a detail view showing a modified form of displacer element.
Fig. 6 illustrates another type of flowmeter provided with a calibrating displacer element.

In Fig. 5 is shown the details of construction of a commercial form of manometer constructed in accordance with my invention. So far as possible, like reference characters will be used to identify parts corresponding to parts having the same function in preceding figures. The venturi 51a in pipe 50 produces a difference between the pressures on the mercury in the respective legs of the manometer. The movement of float 54a in response to variation of the mercury level in the manometer chamber 69 is imparted to the core 8 by the shaft 12, as in Fig. 3. The extensions 12a, 12b cooperate with the guide bracket 80 and the aperture 81 to prevent the core from tilting against the tube 53a which may, as shown, have a liner B of Bakelite, or like material, resistant to chemical action of the fluid above the mercury. The tube 53a forming a part of the high pressure leg may, as previously mentioned, be of copper or other metal or alloy of low specific resistance. The chamber 69 may be provided with a lining 82 of Bakelite or other material chemically inert with respect to the mercury.

The cap 83 forming the top of, and secured to housing 69a, as by nuts 84, threadably receives the member 85 which clamps and seals the lower end of tube 53a and provides a support for the coils 1, 2, encircling the tube. The spring 86, which bears against the upper end of the coil assembly is received by a recess in the lower face of the member 87 which cooperates with plug 88 to clamp the upper end of tube 53a. Member 87 forms a continuation of the pipe 52a whose upper end is suitably held by the coupling member 89 to the block 90a provided with passages 90, 91, 92 for effecting communication between pipe 52 on the high pressure side of the venturi 51a and pipe 52a to the float or manometer chamber 69.

The lower end of the housing 69a, which may be provided with a drain plug 93, is connected to the lower end of chamber 94 of the low-pressure leg of the manometer by tubing 95 and coupling members 96, 97. The displacer element 98 is held in chamber 94, in the position shown, the rod 99 extending upwardly therefrom through tube 55 and block 90a, being received by the blind hole 100 in the sealing plug 101.

The upper end of tube 55 is suitably held to block 90a as by the coupling 102 in communication with the passages 103, 104, 105, the latter opening into tube 56 which extends to the throat of the venturi 51a.

In normal use, the valves 106 and 107 in the pipes 56, 52 are open, and the valve 108 controlling the by-pass passage 109 is closed. When it is desired to check the calibration, valves 106 and 107 are closed and valve 108 opened. This equalizes the pressures in the legs of the manometer tubes, and the mercury level is the same in both, as illustrated by dot-dash line x. The plug 101 is then unscrewed and the displacer 98 lifted above the mercury, as indicated by the dotted line position. The mercury level thereupon falls to y and the position of core 8 thereupon corresponds to that obtaining when the rate of flow produces the same difference in level; that is, the displacer is calibrated to correspond to any desired value on the scale. If the difference between the readings from the chart or scale 41 does not correspond to a factory-determined value, an error will be indicated; such an error may be due to accumulation of dirt on the walls of chamber 69 which of course varies the volume of that chamber. To eliminate the error it is only necessary to clean the chamber.

To check the calibration at two points on the scale, the modified construction in Fig. 5a may be used. When the displacer 98b is lifted above the mercury, displacer 98a remaining therein, the pointer 39 should indicate one predetermined value, and when rod 99 is lifted higher, also to remove the displacer 98a, the pointer 39 should indicate a predetermined higher reading. The calibration may be checked at as many points as desired by providing a corresponding number of displacers, or, alternatively, a single suitably long displacer may be used and rod 99 provided with calibration markings; usually one or two points is sufficient.

To restore the instrument to use, rod 99 is depressed and plug 101 replaced. Then valves 106 and 107 are opened and valve 108 reclosed.

The rounded elements 110 and 111 at the bottom of the float and of the displacer serve as mercury check valves in the event that the instrument is reversely connected to pipe 50, or is subjected to pressures beyond its range.

Though this calibration feature of my invention is of particular value in the system of Figs. 1, 2, 2a, 3 and 5, it can be utilized to advantage in other manometer arrangements; for example, as shown in Fig. 6, the float 54b may be mechanically connected to the indicator or marker 39a. With the pressures equalized on the manometer fluid columns in legs 55 and 69, a certain reading of pointer 39a and scale 41a is obtained with the displacer 98 out of the manometer fluid if the calibration is correct.

What I claim is:

1. The combination with a system comprising a member movable in response to change in magnitude of a condition under measurement, a balanceable network including a pair of inductances an element movable by said member relative to said inductances to change their relative impedances and unbalance said network, a second pair of inductances in said network, an element movable relative to said second pair of inductances to change their relative impedances, of a sensitive detecting instrument having deflecting structure movable in sense and to extent in accordance with the sense and extent of unbalance of said network, a continuously rotating motor, a disengageable driving connection between said motor and said second element, and mechanical relay means controlled by said deflecting structure for engaging said driving connection to effect adjustment of said second element relative to said second pair of inductances in sense and to extent to rebalance said network.

2. A system comprising a member movable in response to change in magnitude of a condition under measurement, a network including a pair of windings, a magnetic element movable by said member for varying the inductances of said windings to unbalance said network, a second pair of windings in said network, a magnetic element movable to vary the inductances of said second pair of windings, deflecting structure responsive to unbalance of said network, a source of power, a disengageable mechanical structure connected between said source of power and said second element controlled by said deflecting structure, and means for intermittently operating said structure to effect rebalance of said network by intermittent movement of said second element.

3. A system comprising a member movable in response to change in magnitude of a condition under measurement, a source of alternating current, a pair of windings connected in series with said source, a magnetic element movable by said member for varying the impedances of said windings, a second pair of windings connected in series to each other and in-parallel to said first pair of windings, a magnetic element movable to vary the impedances of said second pair of windings, a galvanometer coil connected between the common terminal of said first pair of windings and the common terminal of said second pair of windings and responsive to variations of said impedances, and intermittently operable mechanical relay means controlled by said galvanometer coil to effect step-by-step adjustment of said second element in accordance with movement of said first element by said member to change the impedances of said second pair of windings by amounts exactly corresponding to the variation of the impedances of said first pair of windings.

4. A system comprising a member movable in response to change in magnitude of a condition under measurement, a source of alternating current, a pair of windings connected in series with said course, a magnetic element movable by said member for varying the impedances of said windings, a second pair of windings connected in series to each other and in parallel to said first pair of windings, a magnetic element movable to vary the impedances of said second pair of windings, a galvanometer coil connected between the common terminal of said first pair of windings and the common terminal of said second pair of windings, a motor energized from said source independently of said windings, and a disengageable mechanical connection between said motor and said second element controlled by said coil to effect adjustment of said second element in accordance with movement of said first element by said member.

5. A system comprising a member movable in response to change in magnitude of a condition under measurement, a source of alternating current, a pair of windings connected in series with said source, a second pair of windings connected in series with said source in shunt to said first pair of windings, a magnetic element movable by said member to vary the impedances of both windings of one pair, a magnetic element movable to vary the impedances of both windings of said other pair, a galvanometer coil connected in shunt to said pairs of windings, a deflecting element movable by said coil and mechanical relay means having a reversible driving connection including said deflecting element for adjusting said second element in accordance with the movement of said first element by said member.

6. A system comprising a member movable in response to change in magnitude of a condition under measurement, a source of alternating current, a pair of windings connected in series with said source, a second pair of windings connected in series with said source and in shunt to said first pair of windings, a magnetic element movable by said member to vary the impedances of both windings of one pair, a magnetic element movable to vary the impedances of both windings of said other pair, a galvanometer coil connected in shunt to said pairs of windings, a deflecting element movable by said coil in response to unbalanced current between said pairs of windings, a motor continuously energized from said source, and a disengageable mechanical connection between said motor and said second element controlled by said coil and including said deflecting element to effect adjustment of said second element in accordance with the movement of said first element by said member.

7. The combination with a member movable from its normal position in response to a quantity to be measured, an inductive winding and a magnetizable member movable relatively to each other, one of them movable with said movable member, a second inductive winding and magnetizable member movable relatively to each other, of a deflecting member, means for causing deflection thereof in response to change of inductance in said first-named inductive winding, comprising a normally balanced electrical circuit which is unbalanced by said change of inductance, a cam, a continuously rotating motor, intermittently operable mechanical relay structure forming a reversible driving connection between said motor and said cam, means cooperatively engaging said deflecting member for controlling said connection thereby to move said cam member in accordance with movement of said deflecting member, and means co-acting with said cam member for adjusting the position of said second inductive winding and magnetizable member relatively to each other to rebalance said electrical circuit.

8. The combination with a member movable from its normal position in response to a quantity to be measured, an inductive winding and a magnetizable member movable relatively to each other, one of them movable with said movable member, a second inductive winding and magnetizable member movable relatively to each other, of a deflecting member, means for causing deflection thereof in response to change of inductance in said first-named inductive winding, comprising a normally balanced electrical circuit which is unbalanced by said change of inductance, a rotatable cam member, a continuously rotating motor and mechanical relay structure forming a releasable driving connection between said motor and said rotatable cam member, said connection including as a control element said deflecting member, and means actuated by said rotatable cam member for adjusting the position of said second inductive winding and magnetizable member relatively to each other to rebalance said electrical circuit.

9. Apparatus for measuring the flow of a fluid comprising means producing a differential pressure dependent upon the magnitude of flow, a movable member controlled by said differential pressure, a normally balanced electrical measuring circuit comprising a pair of inductive windings and a magnetizable member movable relatively to each other, one of them movable with said movable member, a second pair of inductive windings and magnetizable member movable relatively to each other, and a galvanometer adapted to be deflected in response to change of relative inductances in said first-named pair of inductive windings, mechanical relay structure having a driving connection controlled by said galvanometer for adjusting the position of said second pair of inductive windings and magnetizable member relatively to each other to rebalance said galvanometer, and a marker actuated by said relay structure.

10. A flow measuring system comprising a magnetic member movable in response to variation in rate of flow, a balanceable network including a pair of windings whose impedances are varied by movement of said member, a second pair of windings in said network, a magnetic member movable to vary the impedances of said second pair of windings, a sensitive detecting instrument having deflecting structure movable in sense and to extent corresponding with the sense and extent of unbalance of said network, mechanical relay means including a reversible driving connection controlled by said deflecting structure to effect adjustment of said second member in sense and to extent to rebalance said network, and a flow-indicating element movable by said relay means concurrently with said second member.

11. A flow controlling system comprising a magnetic member movable in response to variation in rate of flow, a balanceable network including a pair of windings whose impedances are varied by movement of said member, a second pair of windings in said network, a magnetic member movable to vary the impedances of said second pair of windings, a sensitive detecting device having deflecting structure movable in sense and to extent corresponding to the sense and extent of unbalance of said network, mechanical relay means having a normally disengaged, reversible driving connection controlled by said deflecting structure to effect adjustment of said second member in sense and to extent to rebalance said network, and a flow controlling element movable by said relay means concurrently with said second member.

12. A flow measuring system comprising a magnetic member movable in response to variation in rate of flow, a network including a pair of windings whose impedances are varied by movement of said member, a second pair of windings in said network, a magnetic member movable to vary the impedances of said second pair of windings, deflecting structure responsive to unbalance of said network, a motor, and a driving connection between said motor and said second element controlled by said deflecting structure to effect adjustment of said second magnetic element by said motor to rebalance said network, and a flow-indicating element moved concurrently with said second member by said motor.

13. A flow controlling system comprising a magnetic member movable in response to variation in rate of flow, a network including a pair of windings whose impedances are varied by movement of said member, a second pair of windings in said network, a magnetic member movable to vary the impedances of said second pair of windings, deflecting structure responsive to unbalance of said network, a motor, and a driving connection between said motor and said second element controlled by said deflecting structure to effect adjustment of said second magnetic element by said motor to rebalance said network, and a flow-controlling element moved concurrently with said second member by said motor.

14. A system comprising a magnetic member movable in response to variation in rate of flow, a metal tube of low specific electrical resistance in which said member is movable, a network including a pair of windings on said tube whose impedances are varied by movement of said member, means energizing said network with a value of current to maintain low the energy losses in said metal tube, a second pair of impedances in said network, a magnetic member movable to vary the impedances of said second pair of windings, sensitive deflecting structure responsive to unbalance of said network, a motor, and a driving connection between said motor and said second member controlled by said deflecting structure to effect adjustment of said second member by said motor to rebalance said network.

15. The combination with a system comprising a member movable in accord with changes in the magnitude of a condition, a balanceable network including inductances with one of which is associated said movable member for varying its impedance, a second member movable with respect to another of said inductances for varying its impedance, of a sensitive detecting instrument responsive to unbalance of said network and comprising an element deflecting in sense and to extent corresponding with the sense and extent of unbalance of said network, and mechanical relay mechanism controlled by said deflecting element and controlling actuation of said second movable member in sense and to extent to rebalance said network.

16. The combination with a system comprising a member movable in accord with changes in the magnitude of a condition, a balanceable network including inductances with one of which is associated said movable member for varying its impedance, a second member movable with respect to another of said inductances for varying its impedance, of a sensitive detecting instrument responsive to unbalance of said network and comprising an element deflecting in sense and to extent corresponding with the sense and extent of unbalance of said network, mechanical relay mechanism controlled by said deflecting element and controlling actuation of said second movable member in sense and to extent to rebalance said network, and a translating device actuated under control of said relay mechanism in accordance with the sense and extent of unbalance of said network.

17. The combination with a system comprising a member movable in accord with changes in the magnitude of a condition, a balanceable network including inductances with one of which is associated said movable member for varying its impedance, a second member movable with respect to another of said inductances for varying its impedance, of a sensitive detecting instrument responsive to unbalance of said network and comprising an element deflecting in sense and to extent corresponding with the sense and extent of unbalance of said network, mechanical relay mechanism controlled by said deflecting element and controlling actuation of said second movable member in sense and to extent to rebalance said network, and an indicator of magnitudes of said condition actuated under control of said relay mechanism in accordance with the sense and extent of unbalance of said network.

18. The combination with a system comprising a member movable in accord with changes in the magnitude of a condition, a balanceable network including inductances with one of which is associated said movable member for varying its impedance, a second member movable with respect to another of said inductances for varying its impedance, of a sensitive detecting instrument responsive to unbalance of said network and comprising an element deflecting in sense and to extent corresponding with the sense and extent of unbalance of said network, mechanical relay mechanism controlled by said deflecting element and controlling actuation of said second movable member in sense and to extent to rebalance said network, and a movable means controlling the magnitude of said condition and actuated under control of said relay mechanism in sense and extent corresponding to the unbalance of said network.

19. The combination with a system comprising a member movable in accord with changes in the magnitude of a condition, a balanceable network including inductances with one of which is associated said movable member for varying its impedance, a second member movable with respect to another of said inductances for varying its impedance, of a sensitive detecting instrument responsive to unbalance of said network and comprising an element deflecting in sense and to extent corresponding with the sense and extent of unbalance of said network, and mechanical relay mechanism controlled by said deflecting element and controlling actuation by progressive increments of said second movable member in sense and to extent to rebalance said network.

20. The combination with a flow measuring system comprising a magnetizable member movable in response to changes in rate of flow of a fluid, a balanceable network including inductances with one of which is associated said movable member for varying its impedance by amounts corresponding to said changes of rates of flow, a second member movable with respect to another of said inductances for varying its impedance, of a sensitive detecting instrument responsive to unbalance of said network and comprising an element deflecting in sense and to extent corresponding with the sense and extent of unbalance of said network, mechanical relay mechanism controlled by said deflecting element and controlling actuation of said second movable member in sense and to extent to rebalance said network, and an indicator of magnitudes of said rates of flow actuated under control of said relay mechanism in accordance with the sense and extent of unbalance of said network.

21. The combination with a flow measuring system comprising a magnetizable member movable in response to changes in rate of flow of a fluid, a balanceable network including inductances with one of which is associated said movable member for varying its impedance by amounts corresponding to said changes of rates of flow, a second member movable with respect to another of said inductances for varying its impedance, of a sensitive detecting instrument responsive to unbalance of said network and comprising an element deflecting in sense and to extent corresponding with the sense and extent of unbalance of said network, mechanical relay mechanism controlled by said deflecting element and controlling actuation of said second movable member in sense and to extent to rebalance said network, and a valve controlling the rate of flow of said fluid and actuated under control of said relay in sense and extent corresponding to the unbalance of said network.

22. The combination with a system comprising a member movable in accord with changes in the magnitude of a condition, a balanceable network including inductances with one of which is associated said movable member to vary its inductance to unbalance said network, a second member movable with respect to another of said inductances for varying its impedance, of a sensitive detecting instrument responsive to unbalance of said network and comprising an element deflecting in sense and to extent corresponding to sense and extent of unbalance of said network, a driven member operatively connected to said second element to move it relative to its associated inductance, a driving member normally ineffective to move said driven member, means responsive to deflection of said deflecting member to vary the relative positions between said driving and driven members preparatory to movement of said driven member, means periodically operable to effect driving engagement between said driving and driven members to move by progressive increments said second member in sense and to extent to rebalance said system.

23. The combination with a system comprising a balanceable network including inductances, means movable in accord with changes in the magnitude of a condition for varying the impedance of at least one of said inductances to unbalance said network, a second movable means for varying the impedance of at least one other of said inductances, of means for effecting step-by-step movement of said second movable means to rebalance said network comprising a mechanical relay mechanism having a driven member operatively connected to said second movable means, a driving member movable in opposite directions from a neutral position for driving said driven member in sense and to extent corresponding to movement of said driving member from its neutral position, a sensitive detecting member having an element deflecting in sense and, within a predetermined range, to extent of the unbalance of said network, and means periodically engaging said deflecting element for positioning said driving member to effect by progressive increments movement of said second movable means to a position to rebalance said network.

24. The combination with a balanceable network having at least a pair of windings with which are associated respectively impedance varying elements, one of said impedance varying elements being movable in sense and to extent corresponding with the sense and extent of change of a condition under measurement to vary the impedance of said winding and thereby unbalance the network, of means for controlling the energization of said network to limit to low values the magnitude of the unbalanced current, mechanical relay means including a source of power independent of said unbalanced current for moving another of said impedance varying elements, a sensitive detecting instrument having a deflecting member operable in sense and magnitude in accordance with the direction and magnitude of said low values of unbalanced current, and means cooperatively associated with said deflecting member for periodically controlling said relay to move said other of said elements in sense and to extent to balance said network.

25. The combination with a Wheatstone-bridge network having at least one inductance coil connected in each leg of the bridge and energized from a source of periodically varying current, of an impedance varying element associated with the coils of two adjacent legs of said bridge to minimize magnetic attractive forces tending to move said element, a second impedance varying element associated with the coils of the remaining legs of said bridge, means responsive to change of a condition under measurement for moving said first element to vary simultaneously the inductances of said coils and unbalance said network, sensitive means including a deflecting member movable in direction and extent corresponding to the direction and extent of the unbalance of said network, a separately powered mechanical means having a driving connection which includes said deflecting member for positively moving said second element to a network-balancing position, and means for intermittently rendering said driving connection effective to move said second element to said balancing position, said connection when ineffective freeing said deflecting member for movement in accordance with unbalance of said network.

26. In a system having a source of periodically varying current, a balanceable network including a pair of windings connected in series with said source, a second pair of windings connected in series with said source and in shunt to said first pair of windings, a magnetizable element movable to vary the impedances of both windings of said first pair to unbalance said network, a second magnetizable element movable to vary the impedances of both windings of said second pair, the combination with means responsive to change of a condition under measurement for moving said first element in direction and extent corresponding to said change, a sensitive detecting instrument including a coil responsive to the unbalance of said network and a deflecting member movable in opposite directions from a neutral position in sense and amount corresponding to the direction and magnitude of said unbalance, a continuously rotating motor energized independently of said network, a driven member connected to said second element positively to position said second element within its associated pair of windings, a normally ineffective reversible driving connection between said driven member and said motor and including said deflecting member for driving said driven member, and means for periodically rendering said mechanical connection effective to move, in accordance with the sense and extent of deflection of said deflecting member from said neutral position, said second member in sense and to extent to change the impedances of said second pair of windings to rebalance said network.

27. The combination with a balanceable network energized from a source of supply and including inductive windings, of a manometer, one leg of which comprises a tube within one of said windings and consisting of a non-magnetizable metal of low specific electrical resistance, means for producing a differential of pressure between the respective legs of said manometer, the thickness of said tube being adequate to withstand maximum variations of said pressure, a member movable within said tube in accordance with changes of said differential pressure for varying the impedance of at least said one winding to produce current unbalance in said network, a sensitive detecting instrument having an element deflecting in sense and, within predetermined limits, to extent corresponding to said current unbalance, said instrument being sufficiently sensitive to produce maximum deflection of said member for a low value of unbalanced current, said network upon maximum unbalance being of a character to limit to a low value said unbalance current to maintain low the energy losses in said tube, and mechanical relay mechanism controlled by said deflecting instrument and controlling actuation of said second element to rebalance said network.

28. A system comprising a member movable in response to change in magnitude of a condition, a network including an inductance, a tube within the field of said inductance of metal having a specific resistance not greater than thirty micro-ohms per centimeter cube, an element within said tube movable by said member relative to said inductance to change its impedance, means controlling the energization of said network to maintain low the energy losses in said tube, a second inductance in said network, a second element movable relative to said second inductance to change its impedance, actuating means operatively associated with said second element to maintain the same in a predetermined position, and sensitive means responsive to current unbalance of said network for controlling said actuating means to effect adjustment of said second element to rebalance said network.

29. Flow measuring means comprising a chamber containing liquid, structure responsive to change in level of liquid in said chamber, a tube of non-magnetizable metal having a specific resistance of the order of that of copper communicating with said chamber, a balanceable network including an inductance associated with said tube, an element within said tube movable by said structure relative to said inductance to change its impedance and thereby unbalance said network, means for controlling the energization of said network to limit to a small value the flow of current in said inductance thereby to prevent substantial energy loss in said metal tube, a second inductance in said network, a second element movable relative to said second inductance to change its impedance, actuating means including driving and driven members, said driven member being connected to said second element, and sensitive means responsive to current unbalance of said network for causing engagement of said driving and driven members to effect adjustment of said second element to a position to rebalance said network.

30. A system comprising a member movable in accord with changes in the magnitude of a condition, a balanceable network including inductive windings with one of which is associated said movable member for varying its impedance, a second member movable with respect to another of said inductive windings for varying its impedance, a tube within said first-named inductive winding, and consisting of metal of low specific electrical resistance, a sensitive detecting instrument responsive to unbalance of said network and comprising an element deflecting in sense and to extent corresponding with the sense and extent of unbalance of said network, and a mechanical relay mechanism controlled by said deflecting element and controlling actuation of said second movable member in sense and to extent to rebalance said system.

31. A system comprising a member movable in accord with changes in the magnitude of a condition, a balanceable network including inductive windings with one of which is associated said movable member for varying its impedance, a second member movable with respect to another of said inductive windings for varying its impedance, a tube within said first-named inductive winding, and consisting of metal of low specific electrical resistance, said first-named movable member disposed within said tube, a sensitive detecting instrument responsive to unbalance of said network and comprising an element deflecting in sense and to extent corresponding with the sense and extent of unbalance of said network, and a mechanical relay mechanism controlled by said deflecting element and controlling actuation of said movable member in sense and to extent to rebalance said system.

32. A system comprising a member movable in accord with changes in the magnitude of a condition, a balanceable network including inductive windings with one of which is associated said movable member for varying its impedance, a second member movable with respect to another of said inductive windings for varying its impedance, a tube within said first-named inductive winding, and consisting of metal having a specific electrical resistance not greater than thirty micro-ohms per centimeter cube, a sensitive detecting instrument responsive to unbalance of said network and comprising an element deflecting in sense and to extent corresponding with the sense and extent of unbalance of said network, and a mechanical relay mechanism controlled by said deflecting element and controlling actuation of said second movable member in sense and to extent to rebalance said system.

WILLIAM MELAS.

CERTIFICATE OF CORRECTION.

Patent No. 2,081,364.  May 25, 1937.

WILLIAM MELAS.

It is hereby certified that error appears in the printed specification of the above numbered patent requiring correction as follows: Page 4, second column, line 14-15, claim 1, after "inductances" insert a comma; line 75, claim 4, for the word "course" read source; and that the said Letters Patent should be read with these corrections therein that the same may conform to the record of the case in the Patent Office.
Signed and sealed this 21st day of September, A. D. 1937.

Henry Van Arsdale (Seal)  Acting Commissioner of Patents.